(12) United States Patent
Okada et al.

(10) Patent No.: US 6,899,779 B1
(45) Date of Patent: May 31, 2005

(54) METHOD OF BENDING LAMINATED MATERIAL

(75) Inventors: Norihisa Okada, Yamaguchi (JP);
Kiyoshi Yoshizaki, Yamaguchi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/890,580

(22) PCT Filed: Feb. 7, 2000

(86) PCT No.: PCT/JP00/00649

§ 371 (c)(1),
(2), (4) Date: Aug. 2, 2001

(87) PCT Pub. No.: WO00/47409

PCT Pub. Date: Aug. 17, 2000

(51) Int. Cl.⁷ .......................... B32B 3/02; B32B 31/00; B21D 47/00
(52) U.S. Cl. .................. 156/152; 156/196; 156/212; 156/221; 428/121; 428/174
(58) Field of Search .................. 156/152, 196, 156/212, 221; 428/72, 76–78, 119, 121, 174, 428/192

(56) References Cited

U.S. PATENT DOCUMENTS

| | | | |
|---|---|---|---|
| 4,078,959 A | * | 3/1978 | Palfey et al. ............... 156/214 |
| 4,853,018 A | * | 8/1989 | Koss et al. .................... 65/94 |
| 4,917,747 A | | 4/1990 | Chin et al. |
| 6,036,802 A | * | 3/2000 | Banks et al. ............... 156/197 |

FOREIGN PATENT DOCUMENTS

| | | |
|---|---|---|
| EP | 0424312 | 4/1991 |
| JP | 03222715 | 10/1991 |
| JP | 09295050 | 11/1997 |

* cited by examiner

*Primary Examiner*—Blaine Copenheaver
*Assistant Examiner*—Barbara J. Musser
(74) *Attorney, Agent, or Firm*—Antonelli, Terry, Stout & Kraus, LLP

(57) ABSTRACT

A laminated material relatively large in thickness and having a curved surface of small radius, wherein a laminated material (170) as a raw material is provided in which surface plates (181, 182) are fixed to both surfaces of a core material (183) and the surface plate (181) on the internal side of an arc is not fixed to the core material (183) and, with one end side of the laminated material (170) fixed to frames (30, 40), the other end of the surface plate (181) is moved in the direction apart from the core material (183) so as to bend it in arc-shape, the other end being not fixed to the core material (183).

14 Claims, 16 Drawing Sheets

METHOD OF BENDING LAMINATED MATERIAL

FIELD OF THE INVENTION

The present invention relates to a method of bending a laminated material.

DESCRIPTION OF THE RELATED ART

According to the prior art bending method, as disclosed in Japanese Patent Laid-Open Publication No. 3-222715, in order to form a small bend radius, a honeycomb panel having a core material using aramid as base material is mounted on a curve forming member, where it is bent and fixed, then the bent portion is heated, cooled and finished.

Further, Japanese Patent Laid-Open Publication No. 9-295050 discloses a method for bending a panel, wherein the panel is sandwiched between a jig having a curved surface and a wing, thereby bending the panel. Japanese Patent Laid-Open Publication No. 9-201624 discloses sandwiching with a fixed roll and a moving roll a panel having one end fixed, then moving the moving roll to bend the panel.

Moreover, Japanese Patent Laid-Open Publication No. 57-205661 discloses a method for bending a laminated board, including adhering a heat insulator to a metal plate, forming a V-shaped cut to the heat insulator adhered to the bending portion, adhering a heat insulator to a second metal plate, and bending said V-shaped portion.

Japanese Utility Model Publication No. 2-8567 discloses providing a V-shaped cut to a sandwich panel from one side of the surface plate, and then bending the same. Lastly, an L-shaped bonding member is fixed to the surface plate having the V-shaped cut.

SUMMARY OF THE INVENTION

The method disclosed in Japanese Patent Laid-Open Publication No. 3-222715 requires the use of a core material having aramid as base material.

The object of the present invention is to provide a laminated material relatively large in thickness and having a curved surface with small radius.

The above object is achieved by the following:
while fixing to a base one end of a laminated material having a first surface plate and a second surface plate respectively fixed to both surfaces of a core material, moving the other end of said first surface plate toward the direction separating from said core material and bending the same into an arc shape;
applying an adhesive on either one of the contact surfaces between the first surface plate on said other end and the core material; and
moving and bending the other end of the core material and the second surface plate along the first surface plate being bent.

DETAILED DESCRIPTION OF PREFERRED EMBODIMENTS

Figure 1:
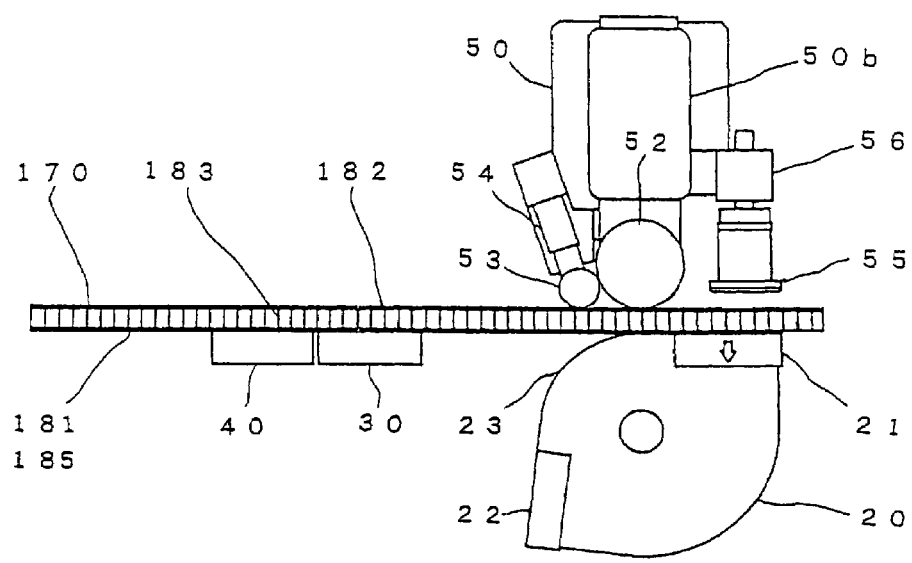
FIG. 1 is a vertical cross-sectional view showing the state where a material panel is mounted to the bending device according to one embodiment of the present invention.

A preferred embodiment of the present invention will now be explained with reference to FIGS. 1 through 16.

The laminated material with a curved surface according to the present embodiment is used for example as the interior member of a railway car. FIGS. 13 through 16 show the example of a laminated material 170 with a curved surface formed according to the present embodiment constituting the interior portion of a railway car, mounted above a window 163 of a car body 160 to the ceiling 162. The laminated material 170 with a curved surface comprises, from the lower side thereof, a linear portion 171, a curved portion 172, a linear portion 173, and a linear portion 174. The material is bent approximately 90 degrees between the linear portion 173 and the linear portion 174. The upper and lower ends of the laminated material 170 are equipped with brackets 176, 177, which are fixed to the car body 160 with screw. The brackets 176, 176 are each fixed to the end portion of the laminated material 170 with a rivet and the like. Reference number 166 is the interior member on the ceiling.

Plural number of laminated materials 170 are mounted along the longitudinal direction of the car body 160. A black sponge-like cushioning pad 168 is arranged at the joint between a laminated material 170 and another laminated material 170. The cushioning pad is arranged in the space defined by surface plates 181, 182 and core materials 183.

The laminated material 170 comprises two surface plates 181 and 182, a core material 183 adhered to the two surface plates, a foam material 184 filled inside the cells of the core material 183, and an interior member 185 adhered to the surface plate 181 facing the interior of the car body (hereinafter called the inner-side surface plate).

Figure 16:
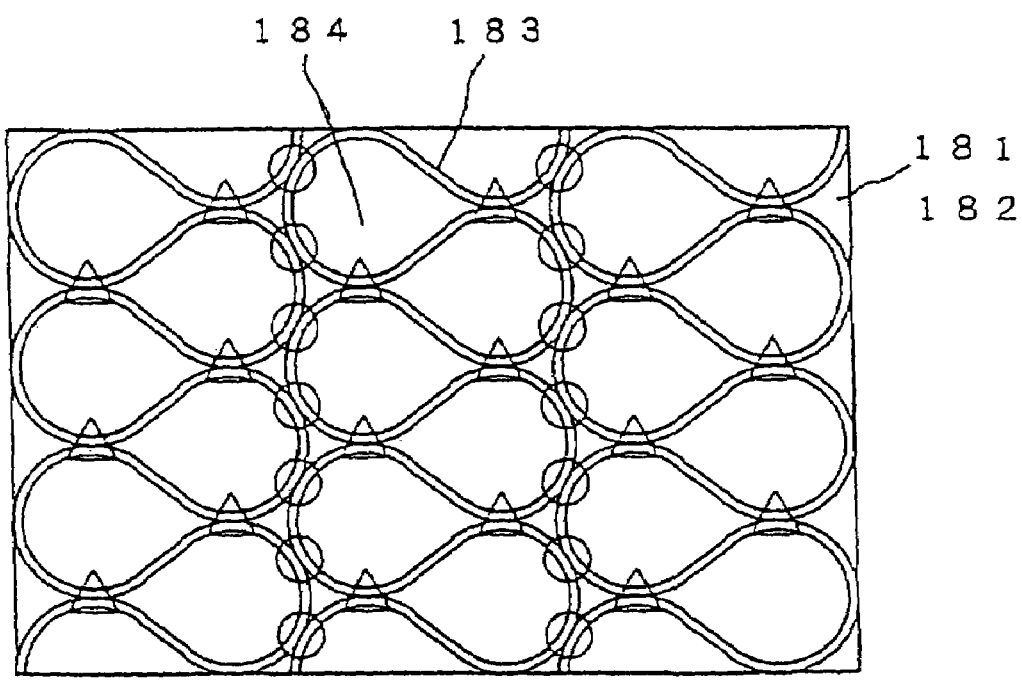
FIG. 16 is a plan view showing the core material of the laminated material.

The core material 183 is made of paper, and is formed by laminating a ribbon bent in arc-like shapes from a single line. In FIG. 16, the areas shown by o are connected using adhesives. The areas shown by Δ are not adhered together. A foam material 184 is filled inside the cells. The direction of bend of the laminated material 170 as explained in the following is the left and right directions in FIG. 16.

The interior member 185 is a face sheet made of vinyl chloride, and is adhered to the surface plate 181. The interior member 185 can be made using materials such as paper, cloth, or resin. The surface plates 181 and 182 are plates made of aluminum alloy and the like. The bracket 186 is mounted to the member after the bending process.

The steps for manufacturing the laminated material 170 will now be explained, wherein the material (raw material) is laminated at first.

First, a foaming resin material or an elastic foaming resin material and the like is injected to the cells of the core material 183, and it is formed therein.

Next, the core material 183 (in which the resin is foamed) is mounted via an adhesive on the surface plate 182, and then, the surface plate 181 having adhesive applied to one end thereof is superposed to the core material 183, thereby adhering the three members together. The adhesive is applied to the whole surface of the surface plate 182. The area to which the adhesive is applied on the surface plate 181 is limited to the range of the linear portions 73 and 74. The area of the surface plate 181 corresponding to the curved portion 172 and the linear portion 171 is not adhered to the core material 183. The interior member 185 is adhered to the surface plate 181.

The size of the surface plates 181, 182 and the core material 183 is explained. For example, the bend radius of the inner-side surface plate of the curved portion 172 is 150 mm, the bend angle is approximately 80 degrees, and the thickness of the core material 183 is 39 mm. The size (width× length) of the core material 183 before the bending process is 1.2 m×2.95 m, the size (width×length) of the surface plate 182 before the bending process is 1.2 m×3.0 m, and the size (width×length) of the surface plate 181 before the bending process is 1.15 m×3.0 m. The widths mentioned above refer to the direction that the laminated material 170 is bent. The length of the surface plate 181 in the direction of bend is shorter than the length of the surface plate 182 or the core member 183. The surface plates 181 and 182 are made of aluminum alloy, and the thickness of the plates is 0.5 mm.

The end of the surface plates 181 and 182 at the side of the linear portion 174 and the end surface of the core material 183 are substantially at the same position. The end of the surface plate 182 at the other end (at the side of the linear portion 171) and the end surface of the core material are substantially at the same position. The end of the surface plate 181 at this other end is receded from the end of the core material 183. When bending is performed as explained in the following, said other end of the surface plate 181 reaches substantially the same position as the ends of the core member 183 and the surface plate 182. In other words, the position of the end of the surface plate 181 is set back from the end surface of the surface plate 182 considering the apparent length that the core material will shrink by the bending process. Moreover, if there is a need to protrude said other end of the surface plate 181 from the end of the core material 183, the length of the surface plate 181 is set accordingly.

The width of the surface plates 181 and 182 are greater than the width of the core material 183. The core material 183 is positioned at the center of surface plates 181 and 182.

Now, the bending method will be explained with reference to FIG. 1 through FIG. 7. In FIG. 1, the laminated material 170 is mounted on the bending device with the interior member 185 (as for the surface plate, the surface plate 181) facing downward. The laminated material 170 is placed on a base 21 of a bending jig 20, a fixing base 30, and a base 40 for flexion bending. At this time, the upper surfaces of each of the bases 21, 30 and 40 are positioned in a horizontally linear state. The base 21 supports the end portion (the mounting side of bracket 186) of the linear portion 171 of the laminated material 170. The bases 30 and 40 support the linear portions 173 and 174.

Each base 21, 22, 30 and 40 has a vacuum suction pad placed on the surface to which the laminated material 170 contacts, and they are positioned with predetermined intervals along the width direction of the laminated material 170.

Next, a bending device 50 is lowered, then a bending roller 52 and a pressing roller 53 is lowered, pressing the material with such a force so as not to crush the core material 183. The lengths of the rollers 52 and 53 exceed the width of the surface plate 182.

Next, after positioning the laminated material 170 to the predetermined position, the suction pad of the base 21 sucks the interior member 185 downward.

Figure 2:
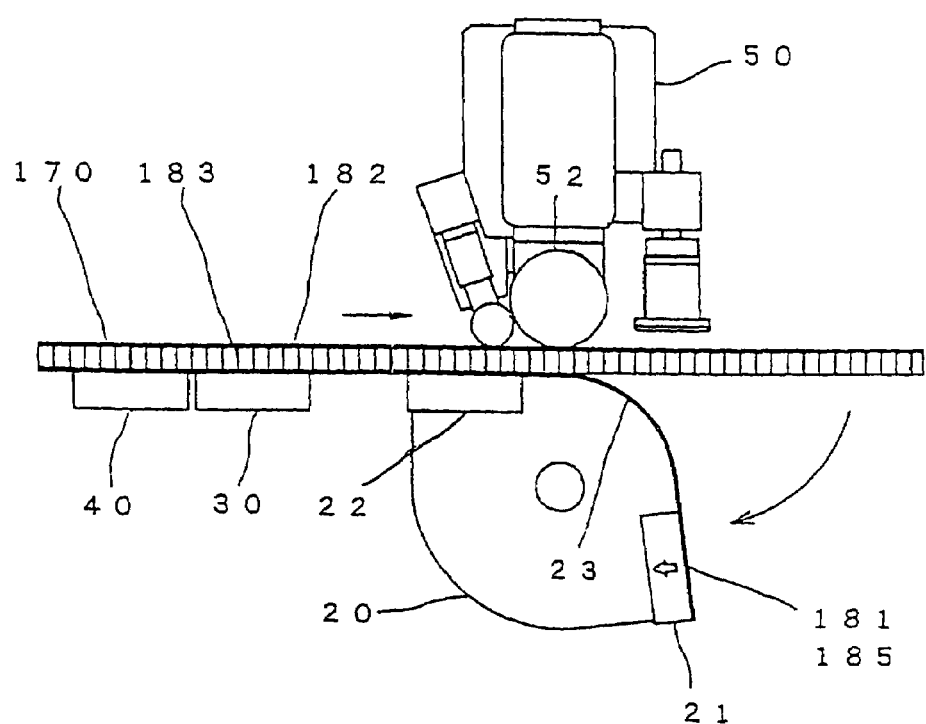
FIG. 2 is a vertical cross-sectional view showing the state following FIG. 1.

Then, as shown in FIG. 2, the bending jig 20 is rotated with the rotation center set to the center of the bend shape, winding the interior plate 185 (the surface plate 181) around the bending jig 20. The bending jig 20 is rotated until the base 22 of the jig 20 moves upward and contacts the interior plate 185. Thereby, the base 22 contacts the linear portion 173 of the laminated material 170. The base 22 is positioned on the same plane as the bases 30 and 40.

At this state, the pressing roller 53 and the bending roller 52 contact the laminated material 170, preventing the core material 173 and the surface plate 181 from dropping to the right side.

After fixing the interior plate 185 to the bending jig 20, the bending jig 20 is rotated so as to wind (bend) the interior plate 185 (including the surface plate 185) around the jig, so along with the rotation of the jig 20, the laminated material 170 is moved toward the direction of rotation (rightward in FIG. 2). In order to facilitate the movement, the bases 30 and 40 should preferably be equipped with rollers to support the laminated material 170.

Next, the suction pad mounted to the base 22 sucks the interior plate 185 downward. Moreover, the suction pad mounted to bases 30 and 40 suck the interior plate 185 downward.

Since the bases 22, 30 and 40 pull the interior plate 185 (laminated material 170) downward, the laminated material 170 will not be displaced in the rightward direction.

When the base 22 sucks the interior plate 185, the bases 30 and 40 are placed on the linear portions 173 and 174, respectively. The area between the bases 30 and 40 is the bend portion of the laminated material 170.

The curved surface 23 of the bending jig 20 between the base 21 and base 22 to which the interior plate 185 contacts has the same radius as the radius of the curved surface portion 172 of the laminated material 170. The curved surface 23 is continuously formed along the width direction of the laminated material 170.

Figure 3:
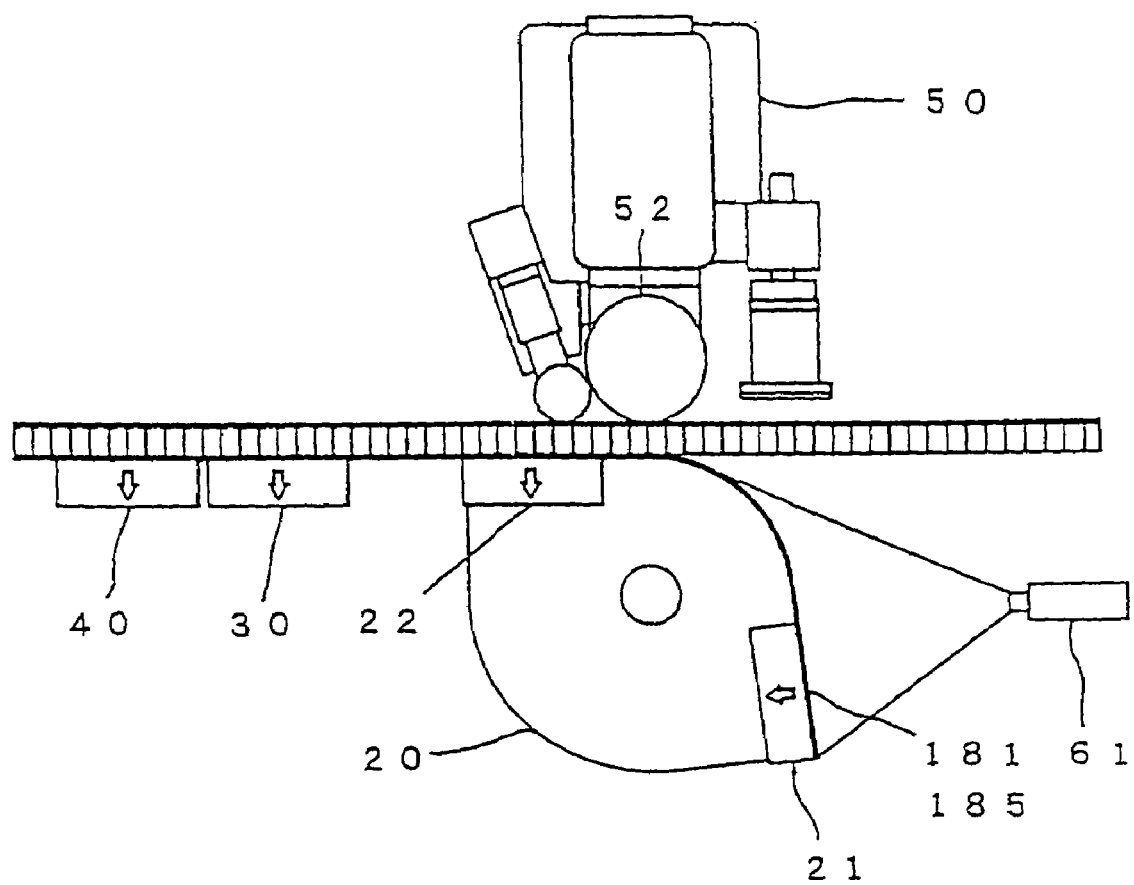
FIG. 3 is a vertical cross-sectional view showing the state following FIG. 2.

Next, as shown in FIG. 3, an adhesive is applied to the surface of the plate 181 facing the core material 183 through a nozzle 61 of an application device. This is performed by directing a nozzle 161 toward the surface plate 181, and moving the same from one end of the laminated material 170 toward the other end thereof.

Figure 4:
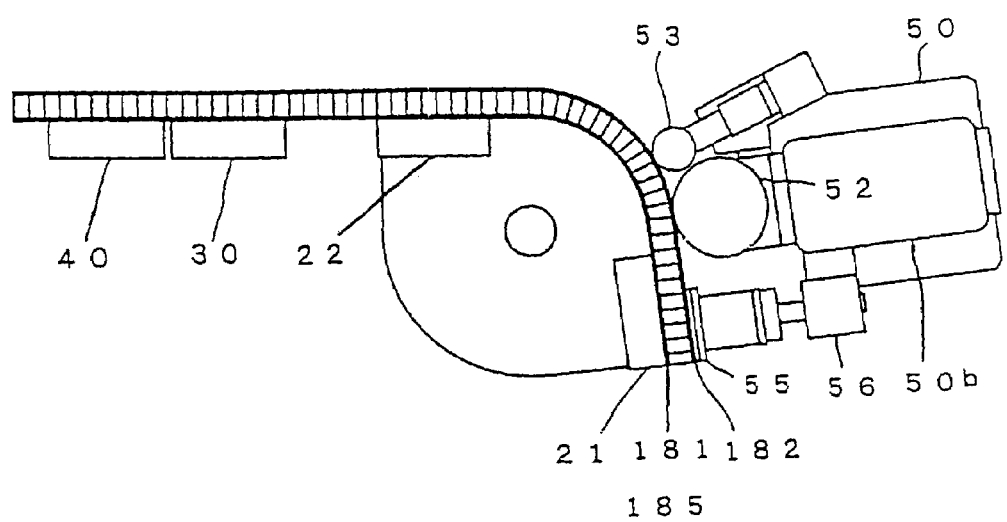
FIG. 4 is a vertical cross-sectional view showing the state following FIG. 3.

Thereafter, as shown in FIG. 4, the bending roller 52 and the pressing roller 53 are rotated so that the center of rotation is set to the rotation center of the bending jig 20. The amount of rotation of the rollers 52 and 53 are equal to the amount of rotation of the bending jig 20, or in other words, the angle of the curved portion 172. Thereby, the core material 183 (the surface plate 182) is wound around the surface plate 181, and the core material 183 is adhered to the surface plate 181.

The pressing roller 53 prevents the member (core material 183, surface plate 182) wound around the surface plate 181 by the bending roller 52 from separating from the plate 181 or the bending jig 20. A cylinder device 54 or a spring elastically supports the pressing roller 53. Therefore, even when rotated as shown in FIG. 4, the pressing roller 53 always contacts the surface plate 182. Further, the rotary axis of the bending roller 52 is positioned along the vertical line passing the rotary axis of the bending jig 20. The pressing roller 53 is placed leftward therefrom.

When the bending roller 52 rotates until the termination point of the curved surface 172, a pressing pad 55 at the front end thereof is protruded so as to press the surface plate 182 (the core material 183) of the linear portion 171 against the bending jig 20. The laminated material 170 of the linear portion 171 is pressed against the base 21. The material is maintained at this state until the adhesive is completely cured. The bending roller 52, the pressing roller 53 and the pressing pad 55 is mounted to a single rotation device. The length of the pressing pad 55 exceeds the width of the laminated material 170. The pressing pad 55 is protruded by the cylinder device 56.

According to the embodiment, the core material 183 together with the surface plate 182 is wound around the surface plate 181, so the core material 183 and the foam 184 inside the cells close to the surface plate 181 are compressed into the circumference direction, and collapsed or crushed. This absorbs the inner and outer circumferential differences created during the bending process.

Since the core material 183 is not collapsed in the thickness direction, the strength of the material is not deteriorated. Furthermore, no gap or offset is generated between the surface plate 181 and the core material 183.

According to experiment, if the material of the surface plates 181 and 182 and the core material 183 are as mentioned, and when the cell size is 14 mm and the thickness of the core material 183 is 39 mm, the material can be bent to have an inner bend radius close to the thickness of the core material, without deteriorating the quality of the material, such as the buckling of the core material 183 or the breakage of the core material around the surface plate 182. This process enables to create a small radius bend. Therefore, the present embodiment enables to bend the laminated material 170 to have a relatively small bend radius.

Figure 5:
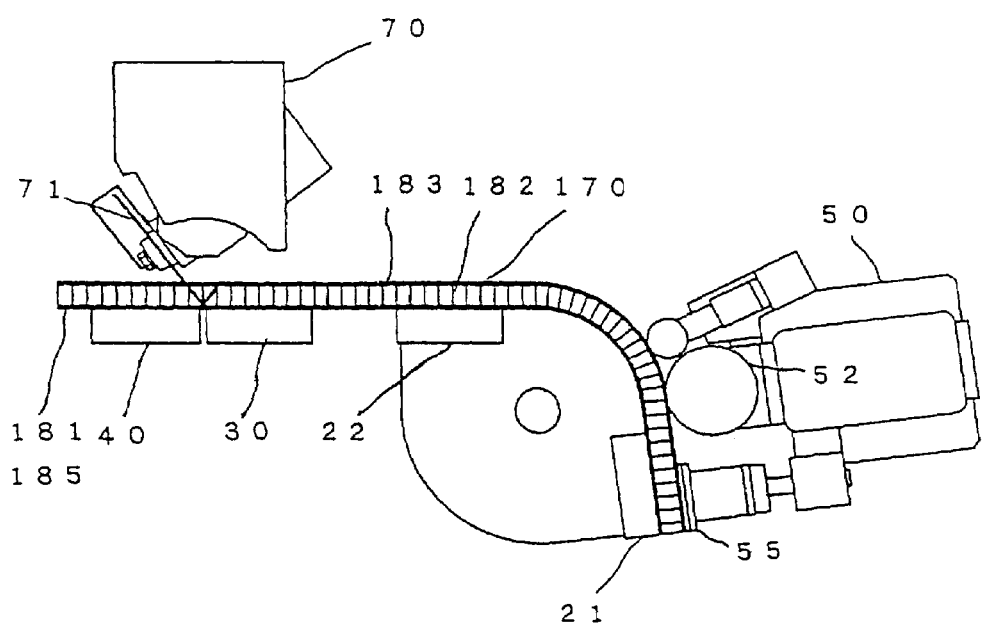
FIG. 5 is a vertical cross-sectional view showing the state following FIG. 4.

Next, as shown in FIG. 5, a V-shaped cut is provided to the laminated material 170 using a circular saw 71 of a cutting device 70. The position to which the V-cut is provided is the flexion-bend position. The circular saw 71 cuts the surface plate 182 and the core material 183, leaving the surface plate 181. The circular saw 71 is tilted against the laminated material 170. After cutting one side of the V-shape, the circular saw 71 is rotated to cut the other side of the V. The cutting device moves along the line of bend.

The cutting process can be performed after holding the laminated material 170 with the pressing pad 55.

Then, the portion cut off by the V-shape cut is removed manually from above. Or, the portion is sucked from above by a suction pad and removed therefrom. Or, the portion is pushed and removed from one end in the width direction of the laminated material 170 by a pusher.

Figure 6:
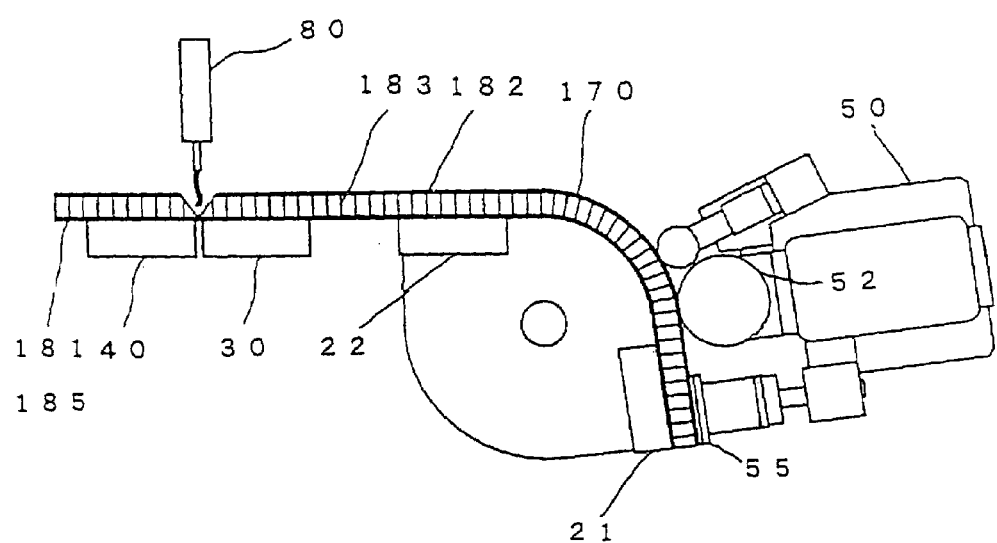
FIG. 6 is a vertical cross-sectional view showing the state following FIG. 5.

Next, as shown in FIG. 6, adhesive is applied through an application device 80 to the space formed by the V-cut. The application device 80 moves from one end in the width direction of the laminated material 170 to the other end, applying the adhesive.

Figure 7:
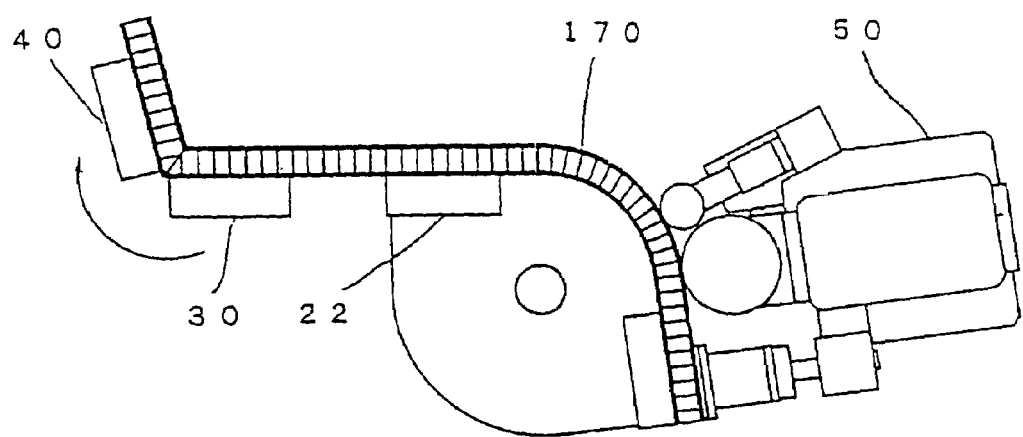
FIG. 7 is a vertical cross-sectional view showing the state following FIG. 6.

Then, as shown in FIG. 7, a bending base 40 rotates for a predetermined angle centering around the vertex of the V-cut portion, thereby bending the laminated material 170. This state is maintained until the adhesive cures completely.

Thereafter, the suction performed by bases 21, 22, 30 and 40 is released. Then, the base 40 is returned to the parallel state. The bend device 50 is removed from the laminated material 170.

Next, the bent laminated material 170 is removed from the bending device.

Lastly, the bend device 50 is rotated to the original position.

Then, brackets 176 and 177 are mounted on the laminated material 170.

According to the above bending method, the interior material 185 can be adhered to the laminated material after the bending process. If there is a need to fold the end of the surface plate 181 toward the core material 183, the end portion should be folded before the surface plate 181 is adhered to the core material 183.

According further to the embodiment, the non-bending areas of the two surface plates and the core material are adhered together before the bending process, but it can be adhered later. For example, the adhesive can be applied after bending the inner surface plate, and then one end of the core material having the outer surface plate adhered thereto can be superposed to the inner surface plate, then the other end thereof can be bent.

When melamine resin is used as the interior member 185, a crack can be formed to the bent portion when the base 40 performs the bending process. In such case, after bending the member, a bent plate is adhered to the surface plates 181 and 182.

Other types of core material can be utilized as the core.

Next, the bending device used in the bending process will be explained with reference to FIGS. 8 through 12. FIG. 9 does not show the application device 60b.

Figure 8:
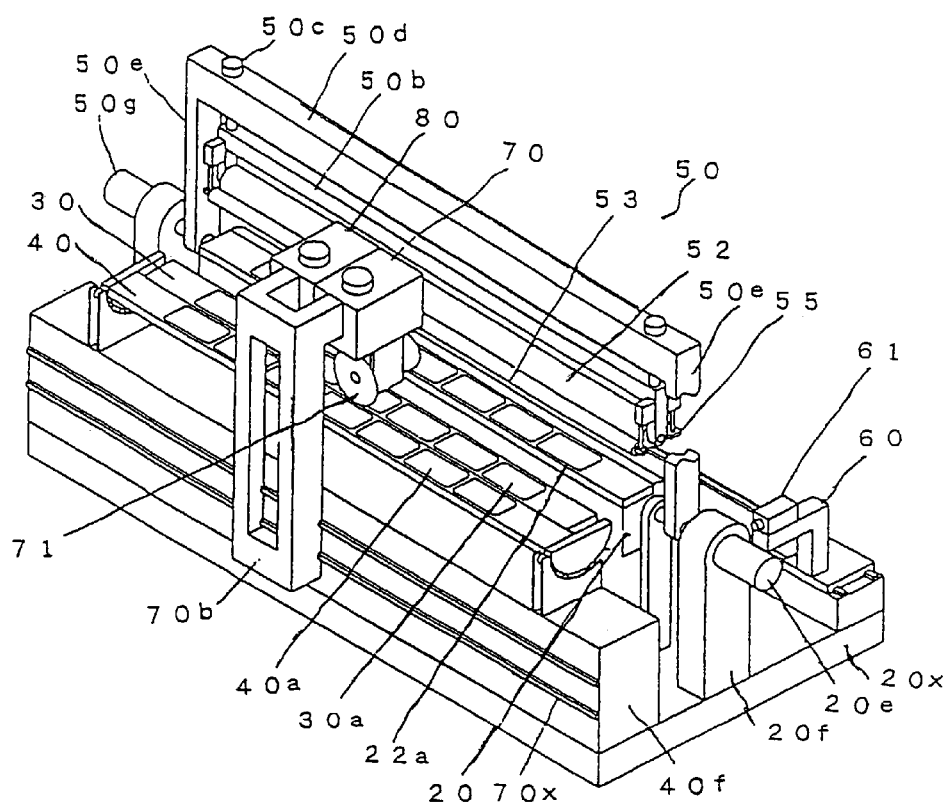
FIG. 8 is a perspective view showing the whole structure of the bending device according to one embodiment of the present invention.
Figure 9:
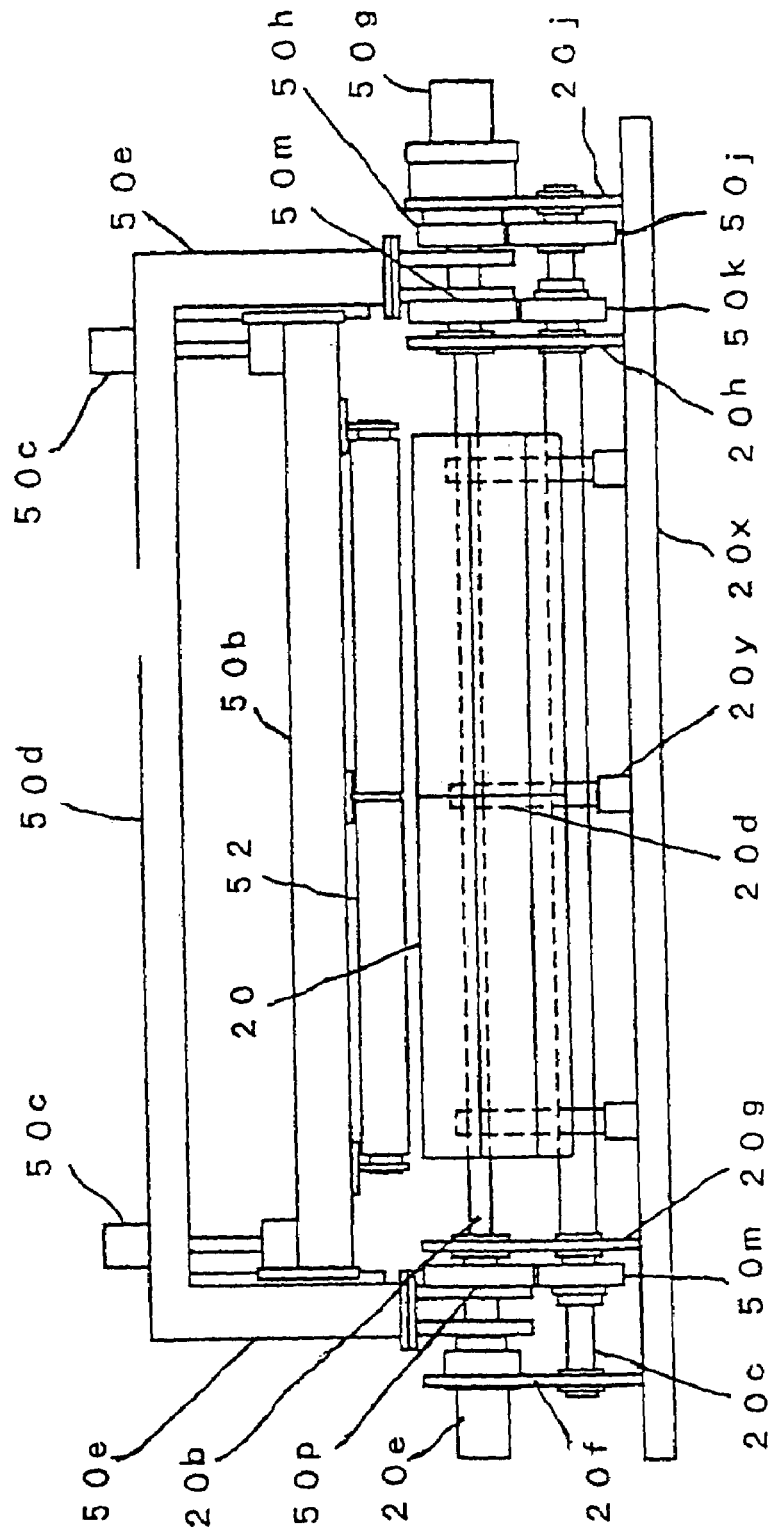
FIG. 9 is a right side view of FIG. 8.
Figure 10:
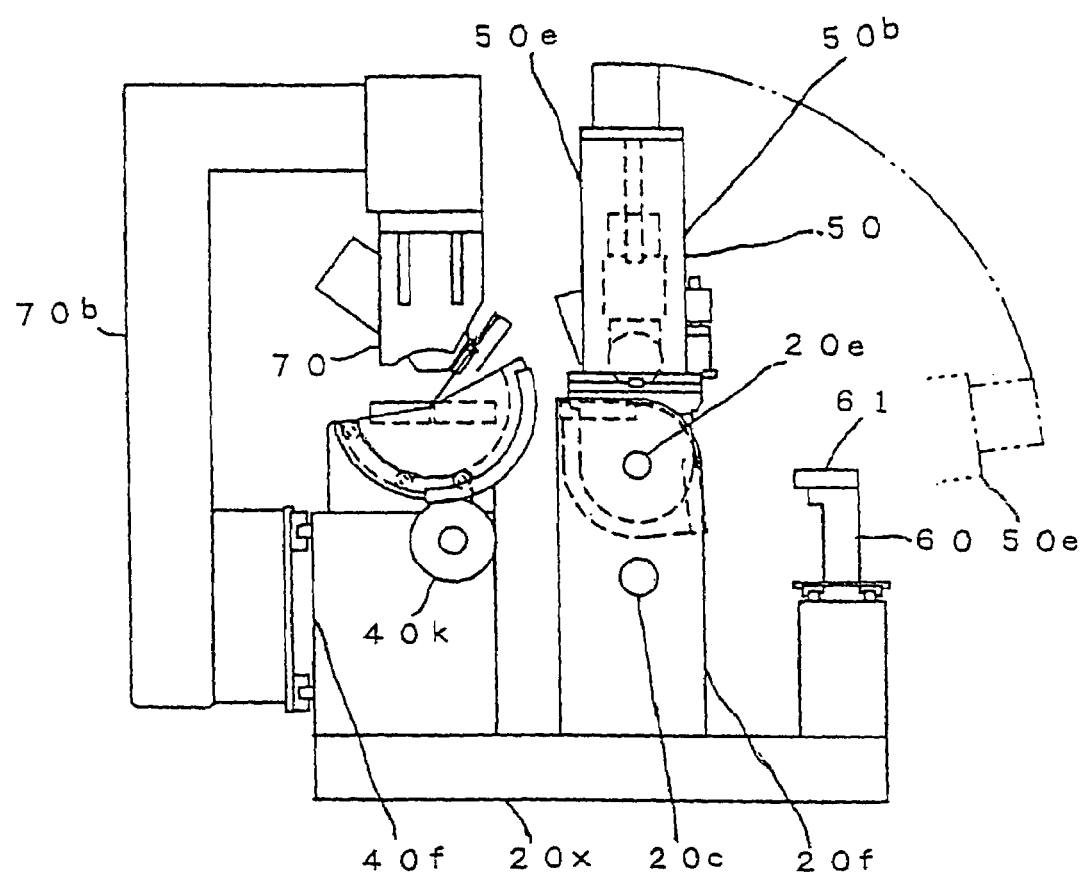
FIG. 10 is a left side view of FIG. 9.
Figure 11:
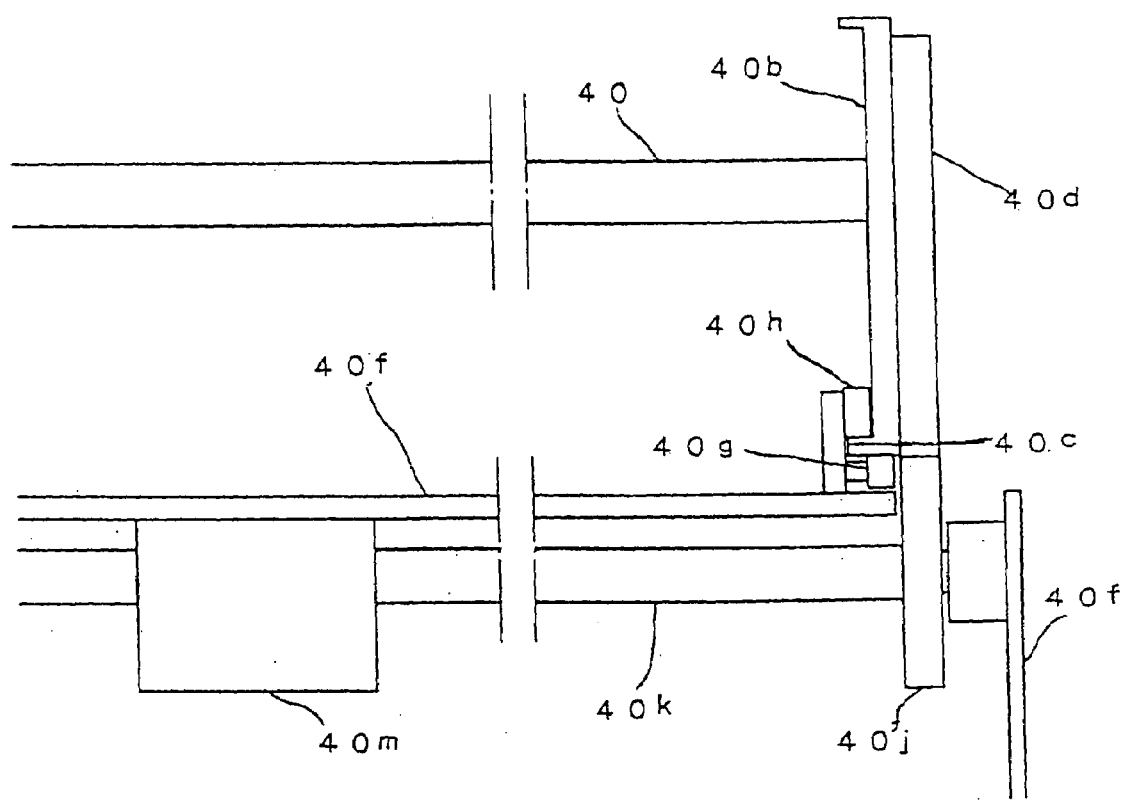
FIG. 11 is a vertical cross-sectional view showing the support portion of the bending base of FIG. 9.
Figure 12:
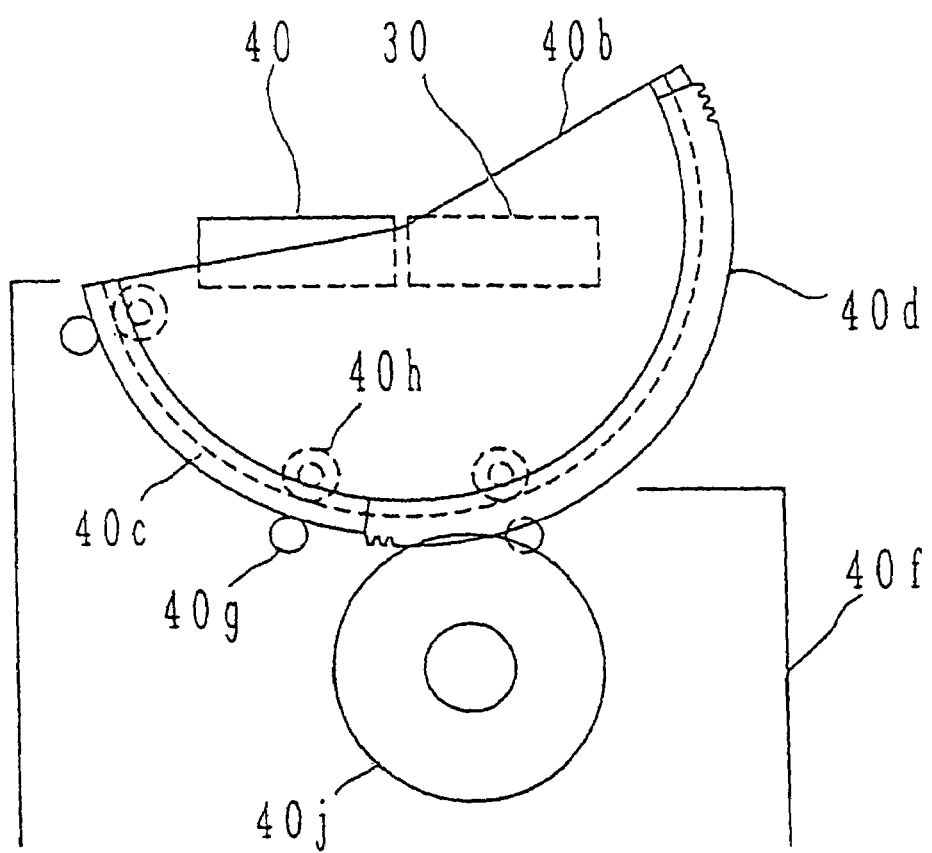
FIG. 12 is a right side view of FIG. 11.
Figure 13:
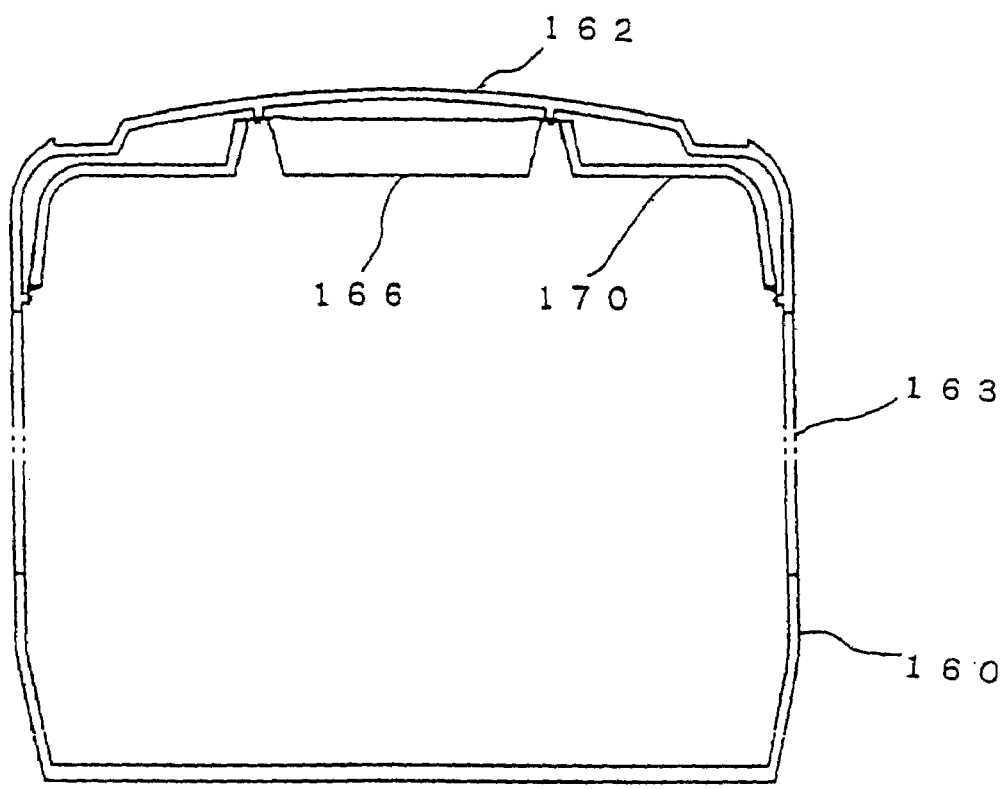
FIG. 13 is a vertical cross-sectional view of a vehicle equipped with the laminated material according to the present invention.
Figure 14:
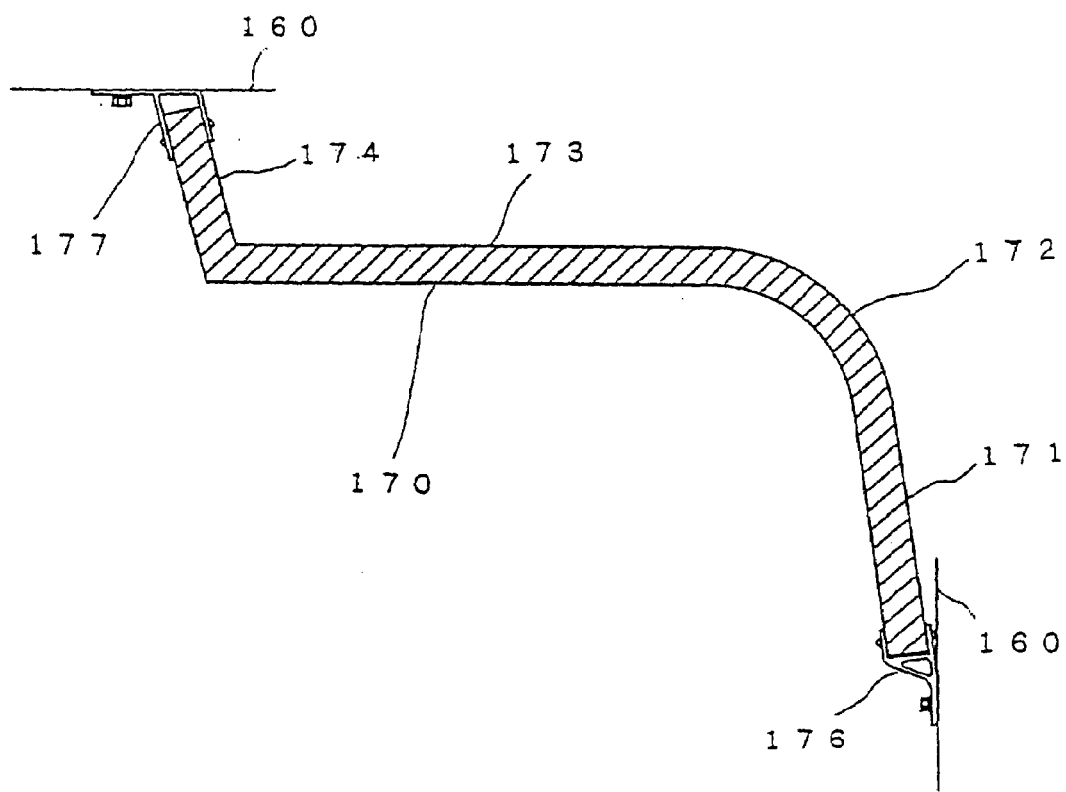
FIG. 14 is a vertical cross-sectional view showing the laminated material of FIG. 13.
Figure 15:
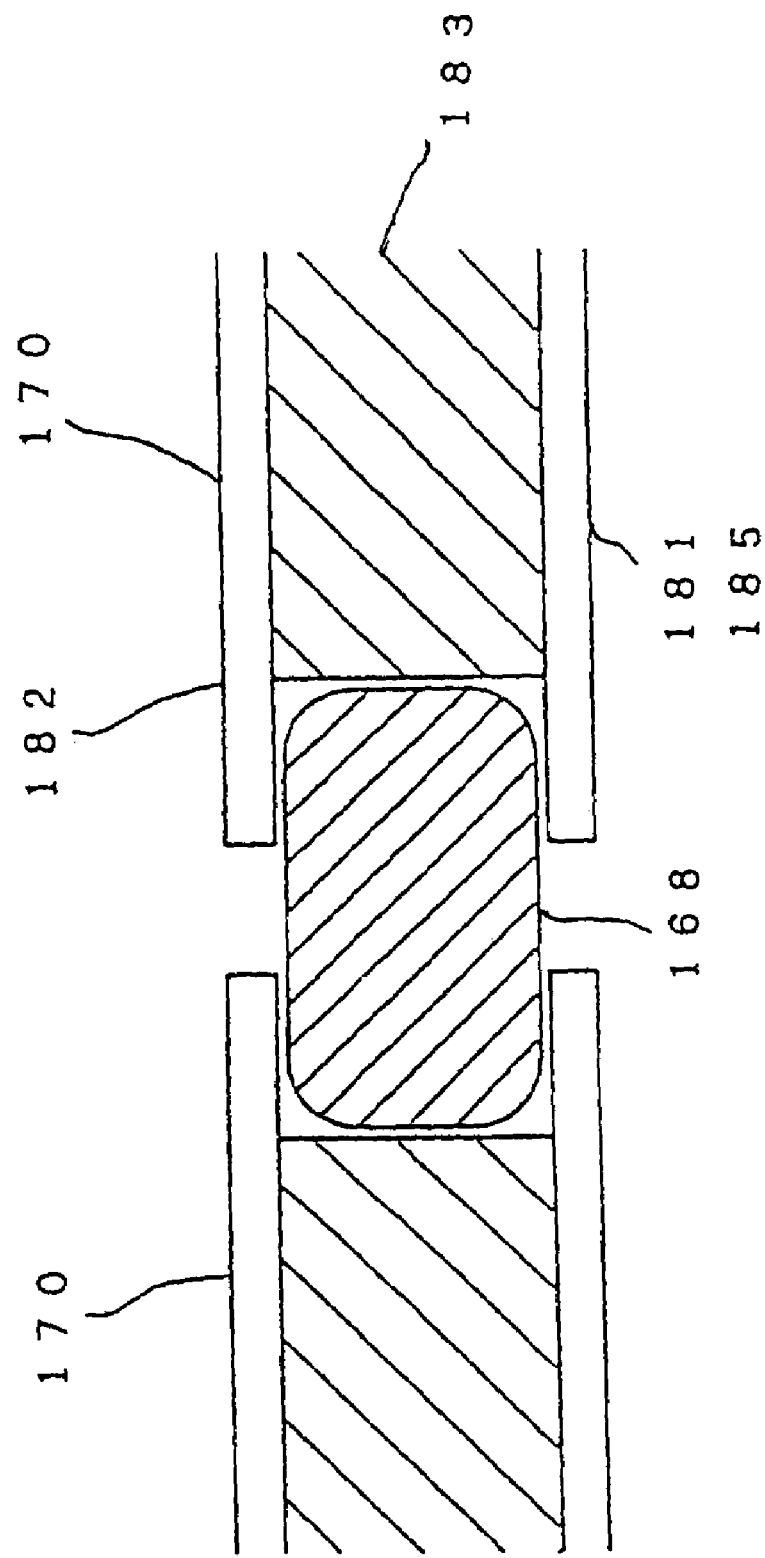
FIG. 15 is a cross-sectional view showing the joint portion of the laminated material of FIG. 13.

In FIG. 8, references 22a, 30a and 40a are suction pads.

An axis 20c is parallel to the axis 20b of the bending jig 20. The axis 20c is directly below the axis 20b. Axes 20b and 20c are connected at predetermined intervals along the axial direction by connecting members 20d. The connecting members 20d can rotate against the axes 20b and 20c. The axis 20b supports the bases 21 and 22 near the connecting members 20d. A bed 20x is placed under the axis 20c. The lower surface of the connecting members 20d are mounted on the bed 20 through seats 20y. Thereby, the bases 21 and 22 are prevented from being bent downward.

The upper surfaces of the connecting members 20d are closer to the axis 20b than the base 21. Therefore, the surface of bases 21 and 22 are formed smoothly.

Four bases 20f, 20g, 20h and 20j support the ends of axes 20b and 20c. A driving device 20e for rotating the axis 20b is mounted on the base 20f. The driving device 20e does not rotate the axis 20c. The driving device 20e comprises a motor.

The bending roller 52, the pressing roller 53 and the pressing pad 55 of the bend device 50 are hung from a crossbeam 50b. The crossbeam 50b is hung from a crossbeam 50d via an elevating device 50c. The left and right ends of the beam 50d are supported by both ends of axis 20b through arms 50e, 50e.

The left and right ends of the crossbeam 50b contact guide rails mounted to the inner sides of arms 50e, 50e. Thereby, even if the beams 50*b* and 50*d* rotate, the position of the bending roller 52 and the like is set to position at a predetermined distance from the axis 20*b*.

The arm 50*e* is supported rotatably by the axis 20*b*. A driving device 50*g* for rotating the arm 50*e* is mounted to the base 20*j* on the other end of the axis 20*b*. The driving device 50*g* includes a motor. The output of the driving device 50*g* is transmitted through gears 50*h*, 50*j*, axis 20*c*, gears 50*k* and 50*m* to the right side arm 50*e*. The gears 50*j* and 50*k* are fixed to the axis 20*c*. Thereby, the axis 20*c* is rotated. Further, the gear 50*n* mounted to the left side of the axis 20*c* rotates the gear 50*p* at the left end of the axis 20*b*. Thereby, the arm 50*e* on the left end is also rotated. The gear 50*n* is fixed to the axis 20*c*.

Two legs on the left and right sides are positioned near the axis 20*b* of the left side of the arm 50*e*. The gear 50*p* is fixed to the leg next to it (hereinafter called the one leg). The gear 50*p* is rotatably supported by the axis 20*b*. The leg on the side of the driving device 20*e* (hereinafter called the other leg) is rotatably supported by the axis 20*b*. Thereby, the arm 50*e* rotates against the axis 20*b* along with the rotation of the gear 50*p*.

The right side arm 50*e* has two legs on the left and right sides near the axis 20*b*. The other leg on the arm 50*e* on the side of the gear 50*h* is rotatably supported by the axis 20*b*. The gear 50*h* is rotatably supported at the end portion of the axis 20*b*. The gear 50*h* is connected to the output shaft of the driving device 50*g*. The end of axis 20*b* is supported by the base 20*j* through gear 50*h*, the output shaft of the driving device 50*g*, and the body of the driving device 50*g*. The gear 50*h* is not fixed to said one leg.

The leg on the side of the gear 50*m* (hereinafter called the leg on the other side) is fixed to the gear 50*m*. The gear 50*m* is rotatably supported by the axis 20*b*. Thereby, the rotation of the gear 50*h* rotates the arm 50*e* against the axis 20*b* via the gear 50*j*, 50*k*, and 50*m*.

Thereby, the left and right arms 50*e*, 50*e* rotate in synchronism. Further, when the driving device 50*g* stops the rotation, the arms 50*e* maintain their state.

The bending roller 52 is divided into plural areas along the longitudinal direction of the crossbeam 50*b*. It is hung from the crossbeam 50*b* at the divided areas.

The pressing roller 53 is divided into plural areas along the longitudinal direction of the crossbeam 50*b*. It is hung from the beam 50*b* at the divided areas via a cylinder device 54. The tip of the rod on the cylinder device 54 supports the axis of the roller 53.

The pressing pad 55 is hung from the beam 50*b* through the cylinder device 56 at plural areas along the longitudinal direction of the beam 50*b*.

The application device 60*b* is mounted on a rail 60*d* of the base 20*x*. The application device 60*b* moves from one end in the width direction of the bending jig 20 toward the other end thereof.

The cutting device 70 and the application device 80 are mounted above a frame 70*b*. The frame 70*b* moves from one end of the bending jig 20 in the width direction toward the other end thereof along a rail 70*x* on a frame 40*d*. The rail 70*x* supports the frame 70*b* so that it will not fall down.

The application device 60*b* and the frame 70*b* can be receded so as not to bump into the width-direction end of the laminated material 170.

Semicircular flanges 40*b* are mounted to the left and right ends of the bending base 40. Each flange 40*b* is supported by the base 40*f* mounted to the base 20*x*. The base 40*f* is equipped with plural rollers 40*g*, 40*h*. The roller 40*g* supports the lower surface of the flange 40*b*. The roller 40*h* contacts the upper surface of a guide rail 40*c* of the flange 40*b*. Further, the base 40 positioned between the left and right flanges 40*b*, 40*b* is equipped with flanges protruding downward in predetermined intervals. The lower surface of these flanges are supported by a roller mounted to the base 40*f*. This enables the flange 40*b* and the base 40 to rotate around a single rotary center without falling from the base 40*f*.

A gear 40*d* is mounted to left and right flanges 40*b*. The gear 40*d* should be enough to cover the rotary angle of the base 40. A pinion gear 40*j* engaged to the gear 40*d* is equipped to the base 40*f*. The gear 40*j* is rotated by an axis 40*k* equipped to the base 40*f*. Reference 40*m* is a driving device that rotates the axis 40*k*.

The base 30 is mounted to the frame 40*d*.

When the bases 20*f*, 20*g*, 20*h* and 20*i* of the bending jig 20 is relatively moved against the frame 40*d* so as to vary the distance between the bases and the frame, a laminated material having a varied distance between the arc-shaped curved portion and the flexion bend portion can be manufactured. For example, the bases 20*f*, 20*g*, 20*h* and 20*i* can be moved along a rail. When the radius of the bending jig 20 differs, the height of the bases 20*f*, 20*g*, 20*h* and 20*i* can be varied.

The technical scope of the present invention is not limited to the terms used in the claims or in the summary of the present specification, but is extended to the range in which a person skilled in the art could easily substitute based on the present disclosures.

According to the present invention, the core material and the outer surface plate are bent after the inner surface plate is bent into an arc, so a laminated plate having a relatively small bend radius for its thickness is easily obtained.

We claim:

1. A method of bending a laminated material comprising:
   while one end of a first surface plate of a laminated material having a first surface plate and a second surface plate respectively adhered to both sides of a core material is fixed on a base, moving the other end of said first surface plate and bending it into an arc-shape, thereby separating said first surface plate at said other end from both said core material and said second surface plate; and
   while the one end of the core material and a second surface plate adhered to said core material is adhered to the one end of said first surface plate, moving and bending the other end of said core material and said second surface plate along said first surface plate being bent, and adhering said core material to said first surface plate.

2. A method of bending a laminated material according to claim 1, wherein said second surface plate extends beyond said first surface plate at the other end of the first surface plate.

3. A method of bending a laminated material according to claim 2, wherein said second surface plate extends beyond the first surface plate such that after moving and bending the other end of the core material and the second surface plate, the other ends of the first and second surface plates are in substantially a same plane.

4. A method of bending a laminated material according to claim 1, wherein the other end of the core material and the second surface plate are moved and bent together, along said first surface plate being bent.

5. A method of bending a laminated material comprising:
   while one end of a first surface plate of a laminated material having a first surface plate and a second surface plate respectively adhered to both sides of a core material is fixed on a base, moving the other end of said first surface plate and bending it into an arc-shape, thereby separating said first surface plate at said other end from both said core material and said second surface plate;

after moving the other end of said first surface plate and bending it into an arc-shape, applying an adhesive to either one of the contact surfaces between said first surface plate and said core material at the other end of the first surface plate; and while the one end of the core material and a second surface plate adhered to said core material is adhered to the one end of said first surface plate, moving and bending the other end of said core material and said second surface plate along said first surface plate being bent, and adhering said core material to said first surface plate.

6. A method of bending a laminated material comprising:

mounting a laminated material having a first surface plate and a second surface plate respectively adhered to both sides of a core material to at least one first base positioned along the horizontal direction;

thereafter, fixing one end of said laminated material to said at least one first base;

while said one end of said laminated material is fixed on said at least one first base, moving and bending the other end of said first surface plate toward the direction separating from said core material, thereby separating said first surface plate at said other end from both said core material and said second surface plate;

applying an adhesive by spraying to either one of the contact surfaces between said first surface plate and said core material at the other end of the first surface plate; and moving and bending said other end of said core material and said second surface plate along said first surface plate being bent, and adhering the other end of said core material to said first surface plate, wherein the bending of said first surface plate is performed by sucking the other end of the first surface plate by an arc-shaped second base positioned at the other end of the first surface plate, and, after fixing said other end of the first surface plate to the second base, rotating said second base on the other end of the first surface plate so that the other end of said first surface plate is moved toward the direction separating from said core material.

7. A method of bending a laminated material according to claim 6, wherein the bending of said core material and said second surface plate is performed by moving a roller from the one end of the second surface plate toward the other end thereof, and at the same time, moving said roller toward said first surface plate.

8. A method of bending a laminated material according to claim 6, wherein, in said laminated material, adhesive is provided on the whole surface of the second surface plate contacting the core material, and adhesive is provided on the surface of the one end of the first surface plate contacting the core material and not on other parts of the surface of the first surface plate contacting the core material.

9. A method of bending a laminated material according to claim 8, wherein said other parts of the surface of the first surface plate contacting the core material, for which adhesive is not provided, includes an area of the surface of the first surface plate which is bent when performing said moving and bending the other end of the first surface plate.

10. A method of bending a laminated material comprising:

while one end of a laminated material, having a first surface plate and a second surface plate respectively adhered to both sides of a core material, is fixed on at least one first base, moving and bending the other end of said first surface plate toward the direction separating from said core material, thereby separating said first surface plate at said other end from both said core material and said second surface plate;

applying an adhesive by spraying to either one of the contact surfaces between said first surface plate and said core material at the other end of the first surface plate; and moving and bending said other end of said core material and said second surface plate along said first surface plate being bent, and adhering the other end of said core material to said first plate, wherein the bending of said first surface plate is performed by sucking the other end of the first surface plate by a second base positioned at the other end of the first surface plate, and moving said second base on the other end of the first surface plate so that the other end of said first surface plate is moved toward the direction separating from said core material, and wherein the bending of said core material and said second surface plate is performed by moving a roller from the one end of the second surface plate toward the other end thereof, and, at the same time, moving said roller toward said first surface plate.

11. A method of bending a laminated material according to claim 10, wherein the one end of said first surface plate is fixed to said at least one first base during the bending of said first surface plate by pressing said laminated material onto said at least one first base by said roller.

12. A method of bending a laminated material according to claim 10, further comprising, prior to said moving and bending the other end of said first surface plate, mounting said laminated material to said at least one first base, positioned along the horizontal direction, and thereafter fixing said one end of said laminated material to said at least one first base.

13. A method of bending a laminated material comprising:

while one end of a first surface plate of a laminated material having a first surface plate and a second surface plate respectively adhered to both sides of a core material is fixed on a base, moving the other end of said first surface plate and bending it into an arc-shape, thereby separating said first surface plate at said other end from both said core material and said second surface plate; and while the one end of the core material and a second surface plate adhered to said core material is adhered to the one end of said first surface plate, moving and bending the other end of said core material and said second surface plate along said first surface plate being bent, crushing the first surface plate side portion of said core material in the direction of the bend, and adhering said core material to said first surface plate.

14. A method of bending a laminated material comprising:

while one end of a first surface plate of a laminated material having a first surface plate and a second surface plate respectively adhered to both sides of a core material is fixed on a base, the core material including a plurality of cells, moving the other end of said first surface plate and bending it into an arc-shape, thereby separating said first surface plate at said other end from both said core material and said second surface plate; and while the one end of the core material and a second surface plate adhered to said core material is adhered to the one end of said first surface plate, moving and bending the other end of said core material and said second surface plate along said first surface plate being bent, crushing the first surface plate side portion of said core material and a foam member filling the plurality of cells of said core material in the direction of the bend, and adhering said core material to said first surface plate.

* * * * *